United States Patent
Tashiro

(10) Patent No.: US 7,167,943 B2
(45) Date of Patent: Jan. 23, 2007

(54) MEMORY APPARATUS

(75) Inventor: Jun Tashiro, Kanagawa (JP)

(73) Assignee: Sony Corporation (JP)

( * ) Notice: Subject to any disclaimer, the term of this patent is extended or adjusted under 35 U.S.C. 154(b) by 64 days.

(21) Appl. No.: 10/149,142

(22) PCT Filed: Oct. 5, 2001

(86) PCT No.: PCT/JP01/08794

§ 371 (c)(1),
(2), (4) Date: Jun. 6, 2002

(87) PCT Pub. No.: WO02/31663

PCT Pub. Date: Apr. 18, 2002

(65) Prior Publication Data

US 2003/0084258 A1 May 1, 2003

(30) Foreign Application Priority Data

Oct. 6, 2000 (JP) ............................. 2000-307200

(51) Int. Cl.
G06F 12/00 (2006.01)
G06F 13/00 (2006.01)
G11C 7/00 (2006.01)
(52) U.S. Cl. ................... 711/103; 711/163; 365/189.01
(58) Field of Classification Search ................ 711/103, 711/163
See application file for complete search history.

(56) References Cited

U.S. PATENT DOCUMENTS

| 3,576,549 | A | * | 4/1971 | Hess et al. ..................... 365/72 |
| 4,691,299 | A | * | 9/1987 | Rivest et al. ........... 365/189.01 |
| 5,202,852 | A | * | 4/1993 | Mizuta ................... 365/189.01 |
| 5,233,576 | A | * | 8/1993 | Curtis et al. ............. 369/13.02 |
| 5,536,923 | A | * | 7/1996 | Foglino ....................... 235/380 |
| 5,644,444 | A | * | 7/1997 | Braithwaite et al. .......... 360/60 |
| 5,826,007 | A | * | 10/1998 | Sakaki et al. ................. 714/42 |
| 6,226,698 | B1 | * | 5/2001 | Yeung et al. .................. 710/57 |

(Continued)

FOREIGN PATENT DOCUMENTS

EP 0 412 251 A2 2/1991

(Continued)

OTHER PUBLICATIONS

U.S. Appl. No. 60/192,194, filed Mar. 2000, Chrisop et al.*

Primary Examiner—Mano Padmanabhan
Assistant Examiner—Mardochee Chery
(74) Attorney, Agent, or Firm—Lerner, David, Littenberg, Krumholz & Mentlik, LLP

(57) ABSTRACT

When a read request has been received, it is determined whether there is a read address that has been designated in a particular area. When a read address has been designated in the particular area, the process is terminated. In other words, the process is completed although data is not read. When a read address has not been designated in the particular area, data is read from the designated address of the memory. The data that has been read is supplied to a host device. After the data has been read, a read address stored in, for example, a register is written to the particular area. The address from which data has been read is appended to the particular area. In such a manner, data that has been read from the host device is prohibited from being accessed.

21 Claims, 8 Drawing Sheets

U.S. PATENT DOCUMENTS

| | | | |
|---|---|---|---|
| 6,420,971 B1 * | 7/2002 | Leck et al. | 340/542 |
| 6,658,438 B1 * | 12/2003 | Moore et al. | 707/205 |
| 6,715,049 B1 * | 3/2004 | Hayakashi | 711/163 |
| 2001/0025343 A1 * | 9/2001 | Chrisop et al. | 713/193 |

FOREIGN PATENT DOCUMENTS

| | | |
|---|---|---|
| EP | 0 671 711 A1 | 9/1995 |
| FR | 2 790 854 A3 | 9/2000 |
| JP | 62-189601 A | 8/1987 |
| JP | 63-153633 A1 | 6/1988 |
| JP | 06-004996 A1 | 1/1994 |
| JP | 7-85342 A | 3/1995 |
| JP | 10-134160 A1 | 5/1998 |
| JP | 10-269144 A1 | 10/1998 |
| JP | 10269144 A * | 10/1998 |
| JP | 2000-48533 A | 2/2000 |
| JP | 2000-148599 A | 5/2000 |

* cited by examiner

INITIAL STATE

DATA WRITTEN

DATA ERASED

INITIAL STATE

N = 3

N = 5

ERASE (N = 8)

MEMORY APPARATUS

The present invention relates to a memory apparatus, a memory apparatus controlling method, and an information processing system that use an irreversibly writeable memory that allows the security of data stored therein to be improved.

Recently, memory cards of which a flash memory and a control portion therefor are integrated have been practically used as data record mediums. For example, still pictures photographed by a digital camera are recorded to a memory card. A memory card that uses a flash memory allows data to be written a plurality of times. In addition, memory cards have been used as storage mediums that store copyrighted data distributed through an electronic music distribution.

Since a flash memory is an erasable memory, it can be restored to the initial state any time. In addition, since data stored in a flash memory can be relatively easily forged, the security of authentication data, passwords, encryption key data, and so forth stored in a flash memory is weak. Moreover, in a device that uses a conventional memory card, after data is read therefrom, the data is not erased in the memory card. Thus, a copy of data that has been read from the memory card can be made. Thus, there is a problem from a viewpoint of copyright protection.

Thus, it is desirable to provide a memory apparatus that allows the security of data stored therein to be improved and prevents data stored therein from being copied.

SUMMARY OF THE INVENTION

To solve the forgoing problems, an aspect of the invention is a memory apparatus attachable to and detachable from a host device, comprising an irreversibly writeable memory, a control circuit that controls operations of writing to and reading from the irreversibly writeable memory, and a data buffer circuit, wherein after data written to the irreversibly writeable memory is read to the data buffer circuit, all previously unchanged one-time writeable data units of a data area on the irreversibly writeable memory from which the data has been read are changed from their initial state so that the data is prohibited from being further read.

Another aspect of the invention is a memory apparatus attachable to and detachable from a host device, comprising an irreversibly writeable memory, a control circuit that controls operations of writing to and reading from the irreversibly writeable memory, a data buffer circuit, and a data area that stores reproduction restriction information disposed in the irreversibly writeable memory or in an irreversibly writeable memory region of the control circuit, wherein when data written to the irreversibly writeable memory is to be read and the reading operation is restricted by the reproduction restriction information, the reading operation is prohibited.

A further aspect of the invention is a memory apparatus attachable to and detachable from a host device, comprising an irreversibly writeable memory, a control circuit that controls operations of writing to and reading from the irreversibly writeable memory, a data buffer circuit, and at least one data area disposed in the irreversibly writeable memory or in an irreversibly writeable memory region of the control circuit, the data area storing a reading operation count value that represents the number of times that associated data has been read from the irreversibly writeable memory, wherein whenever the associated data is read, the state of one of a plurality of one-time writeable data units in the data area is changed, and when the state of all of the one-time writeable data units in the data area have been changed, the reading operation is prohibited.

According to these aspects of the present invention, whenever data is read from the irreversibly writeable memory, an operation is performed so that the read data is then or subsequently prohibited from being read again so that the security of data stored in the irreversible writeable memory is improved. When a reproducing operation for reading data stored in the irreversibly writeable memory is restricted, the reproduction restriction information is written to an irreversible write memory, so that the reproduction restriction information is prevented from being forged.

DETAILED DESCRIPTION

Figure 1:
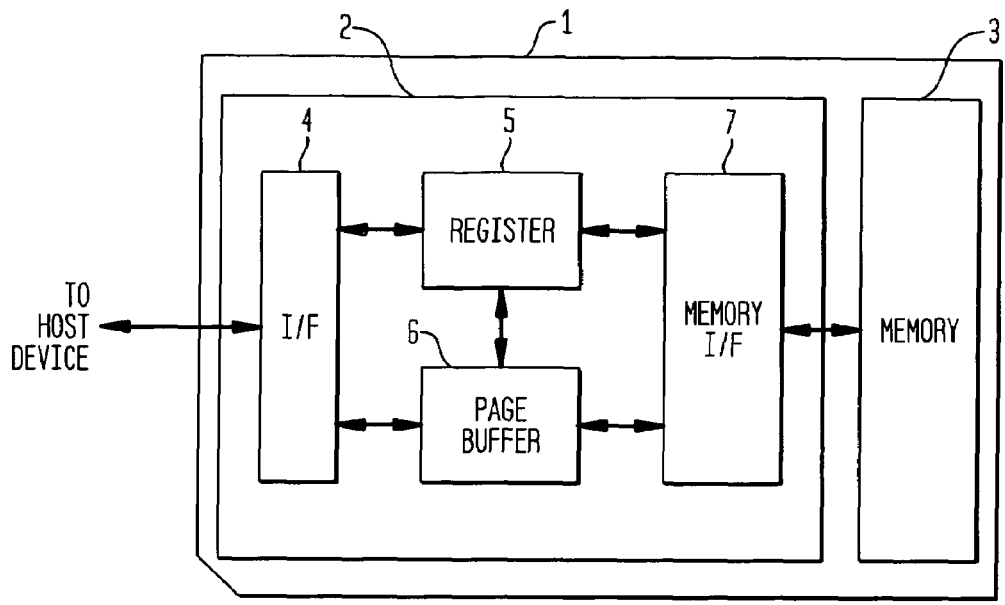
FIG. 1 is a schematic diagram showing an example of a memory apparatus according to the present invention.

Next, with reference to the accompanying drawings, an embodiment of the present invention will be described. FIG. 1 shows the structure of a memory apparatus according to the embodiment of the present invention. A host device (not shown) and a memory apparatus 1 are connected through, for example, a serial interface. The memory apparatus 1 has a control IC 2 and a memory 3. The memory apparatus 1 is formed in a card shape so that it can be attached to and detached from the host device.

The host device generates data to be written to the memory apparatus 1. In addition, the host device reads data from the memory apparatus 1 and performs a variety of data processes using data that has been read from the memory apparatus 1. The host device is, for example, a digital electronic camera. The host device writes a photographed picture to the memory apparatus 1. Moreover, the host device reads a picture from the memory apparatus 1. Another example of the host device is an audio recording/reproducing apparatus. In this case, compressed audio data is written to the memory apparatus 1. In addition, compressed audio data is read from the memory apparatus 1.

The control IC 2 has an interface 4, a register 5, a page buffer 6, and a memory interface 7. The interface 4 interfaces with the host device. Data (write data or read data and command data), a control signal, power, and so forth are exchanged between the host device and the memory apparatus 1 through the interface 4. The register 5 stores addresses. The page buffer 6 temporarily stores write data or read data. The control IC 2 and the memory 3 may be integrated as one IC device. On the other hand, the control IC may not be composed of only one IC. The memory interface 7 is an interface disposed between the control IC 2 and the memory 3. The control IC 2 is provided with a sequencer (controller) composed of a CPU (not shown).

The memory 3 is an irreversibly writeable memory that is a one-time-writeable nonvolatile semiconductor memory. The memory 3 is referred to as OTP (One Time Programmable ROM). In other words, once data is written to the memory 3, the data cannot be erased. Even if the power of the memory 3 is turned off, the stored data is retained. In the memory 3, data is read and written with a predetermined data amount at a time. The memory 3 is provided with a boot area that is read by the host device immediately after the memory is attached thereto. In the boot area, various types of information such as attribute information are pre-recorded.

As was described above, the memory 3 is irreversible with respect to the writing operation. In other words, once the initial state of a portion of the memory 3 is changed, it cannot be restored to the initial state. On the other hand, a portion that has not been changed from the initial state can be changed later. FIG. 2 shows state changes of a data storage area of the memory. In FIG. 2, each square area represents a data unit, for example, a bit. Each white area represents a non-changed (initial state) data unit, for example, a "0" bit. Each black area represents a data unit that has been changed by the writing operation. In other words, each black area represents an irreversibly written data unit, for example, a "1" bit.

Figure 2A:
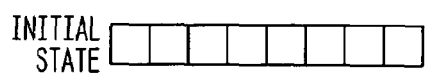
FIG. 2A and FIG. 2B are schematic diagrams for explaining an overwriting operation for data and an overwriting operation for reproducing operation count information according to the present invention.
Figure 2A:
Figure 2A:

As shown in FIG. 2A, some of the data units are changed so that the data area changes from its initial state to a data written state in which data values are stored in the data area. After the stored data is no longer needed, all of the previously unchanged data units are changed. As a result, the data stored in the area becomes meaningless data. This operation is equivalent to a data erasing process. The irreversibly writeable memory 3 may also be provided with a counter area that records reproduction restriction information, for example, a data reading operation count value (the current reproducing operation count value) N.

Figure 2B:
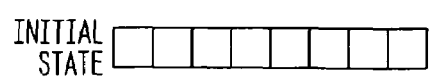
Figure 2B:
Figure 2B:
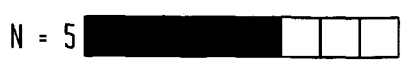
Figure 2B:

FIG. 2B shows a process for the counter area. Whenever data is reproduced from irreversibly writeable memory and, for example, the counter area is in the initial state (N=0), a data unit of the counter area is changed to increment the value of N. FIG. 2B also shows examples of a state (N=3) and a state (N=5). In FIG. 2B, since there are eight data units, the reproducing operation permission value, namely the maximum reproducing operation count value, is eight. When the data reading operation count value becomes (N=8), all the data units in the counter area have been changed. It is also possible to directly change the state of the counter area from the state (N=5) to the state (N=8). In the (N=8) state, further data cannot be written to the counter area. This state is equivalent to the state that the data in the counter area has been erased. Since the data storage area and the counter area are provided in an irreversibly writeable memory, it is impossible to forge data that represents the reproducing operation count value or that represents the reproducing operation permission value. Thus, the copyright of data can be securely protected.

Figure 3:
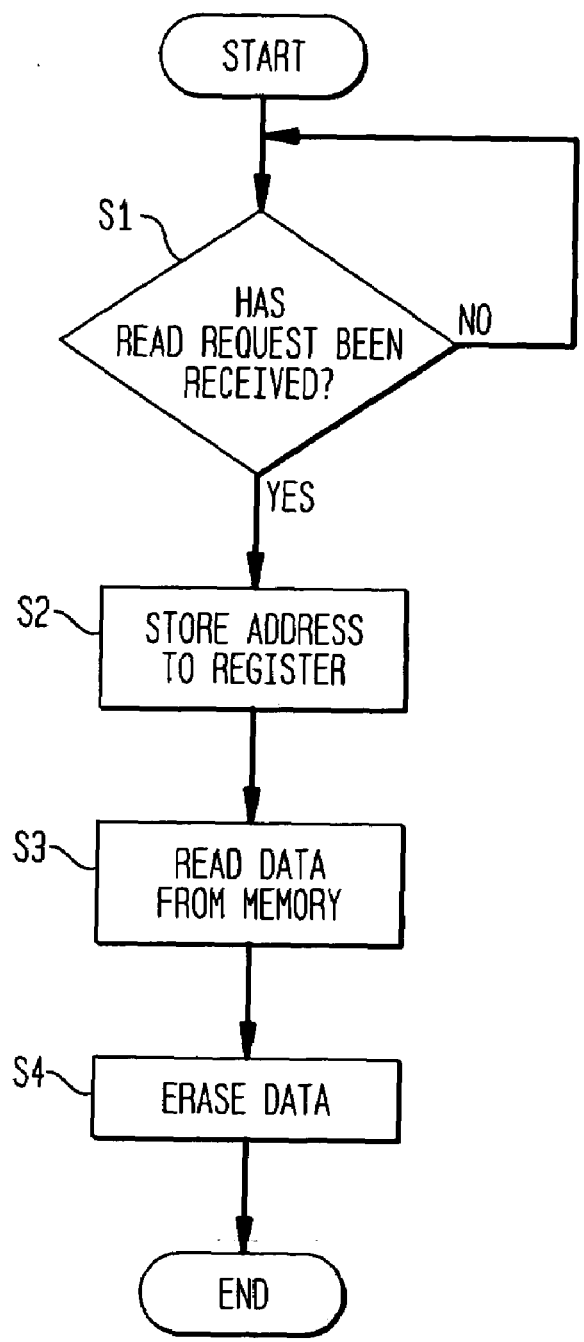
FIG. 3 is a flow chart for explaining a first example of the data reading operation according to the embodiment of the present invention.

Next, several examples of processes performed with the memory apparatus 1 will be described. FIG. 3 is a flow chart showing an operation that simultaneously reads data from the memory apparatus 1 and erases data therefrom. This operation is controlled by a sequencer with which the control IC 2 is provided.

At step S1 shown in FIG. 3, it is determined whether a read request has been received from the host device. When a read command and a read address are received from the host device, the flow advances to step S2. At step S2, the read address is stored to the register 5. At step S3, data is read from a designated address of the memory 3. The read data is stored to the page buffer 6. In addition, the data is output from the page buffer 6 to the host device through the interface 4. Alternatively, the read data may be directly supplied to the host side without the page buffer 6. After the data has been read from the memory 3, the flow advances to step S4. At step S4, with reference to the read address stored in the register 5, the data stored at the address is erased in the manner described above. Thus, in the process shown in FIG. 3, data can be read from the memory 3 only one time.

Figure 4:
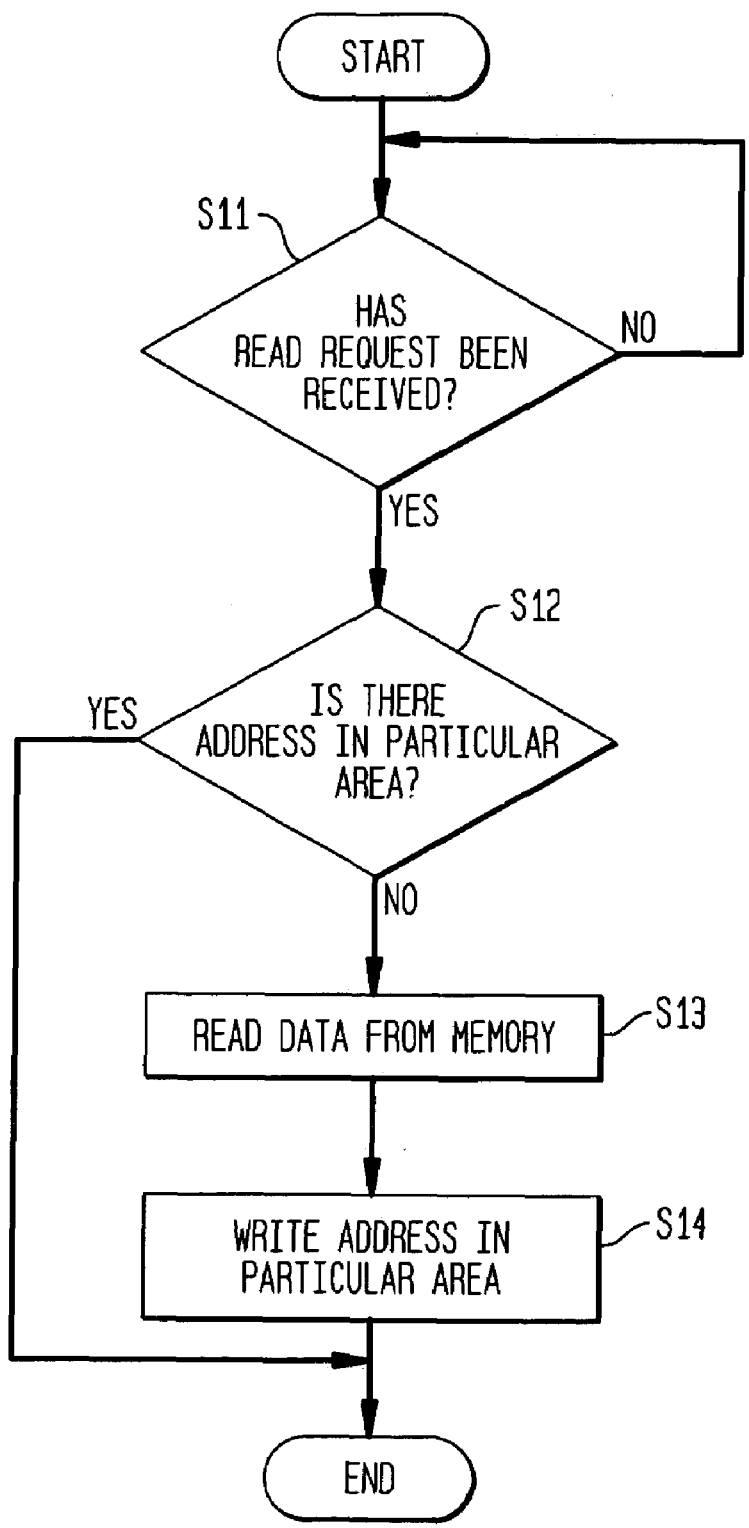
FIG. 4 is a flow chart for explaining a second example of the data reading operation according to the embodiment of the present invention.

FIG. 4 is a flow chart showing an example of another process. At step S11, it is determined whether a read request has been received. When the determined result at step S11 represents that a read request has been received, the flow advances to step S12. At step S12, it is determined whether there is a designated read address in a particular area. The particular area is a region of the irreversibly writeable memory 3 or of the control IC 2. When a further nonvolatile irreversibly writeable memory region is disposed in the control IC 2, in addition to the irreversibly writeable memory 3, the particular area can be formed in the control IC. When the determined result represents that there is an address in the particular area, the process is terminated. In other words, although data is not read, the process is terminated. In reality, the host device receives error information instead of read data corresponding to a read command that the host device has sent to the memory 3. Thus, the host device recognizes that the data cannot be read. In other processes that will be described with reference to respective flow charts, when data cannot be read, a similar process is performed.

When the determined result represents that there is no address in the particular area, data is read from the designated address of the memory 3. The read data is supplied to the host device (at step S13). Thereafter, the flow advances to step S14. At step S14, the address of the read data, which is stored in the register 5, is written to the particular area. The read address may be appended to other addresses stored in the particular area. In this case, the particular area may have an address map in which data corresponding to a readable address may be changed to the one that is prohibited from being read. At step S12, the map may be referenced.

Figure 5:
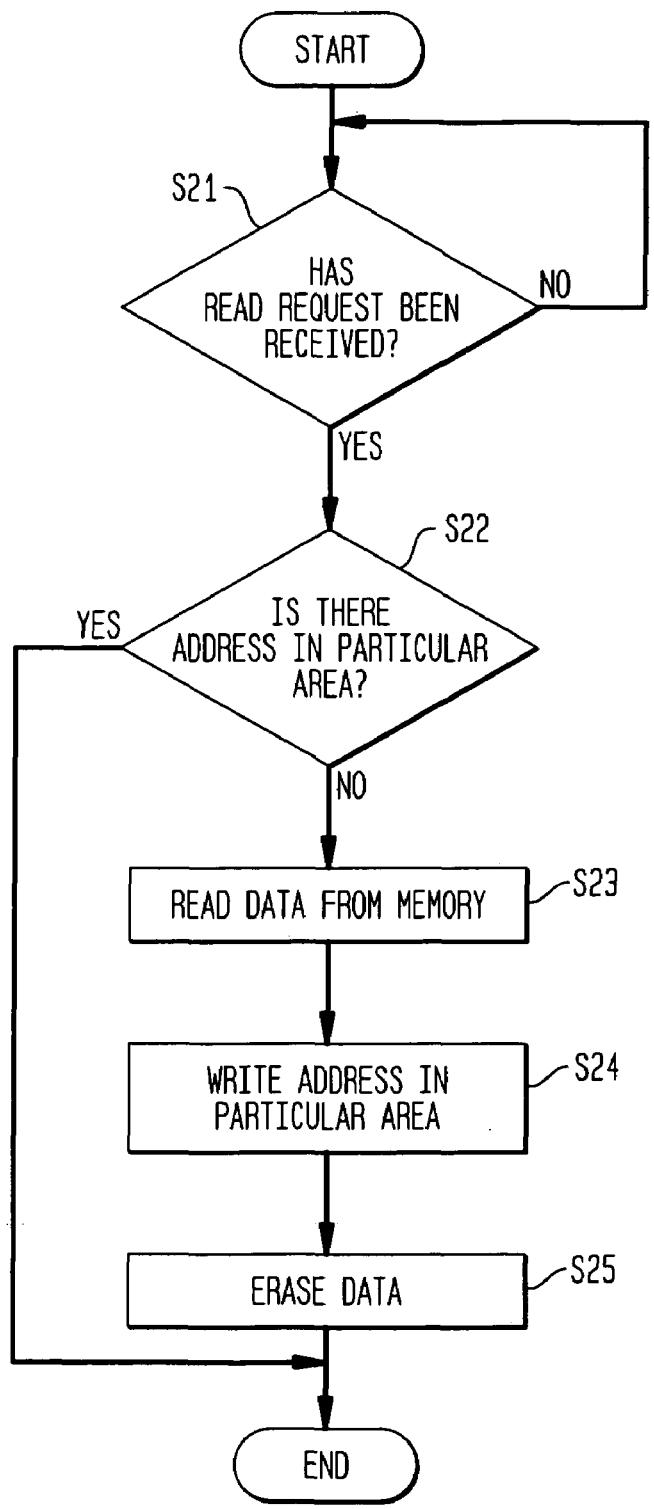
FIG. 5 is a flow chart for explaining a third example of the data reading operation according to the embodiment of the present invention.

Thus, in the operation shown in FIG. 4, when data is read from the memory 3, the read data is not erased therefrom. Instead, access to the memory 3 is controlled so that the host device cannot further access the data that has been read from the memory 3. Alternatively, data may be effectively erased from the memory 3 in the manner described above so that the data cannot be accessed at all. In this case, the security of data may be more improved than the operation shown in FIG. 4. In other words, at step S25 of the flow chart shown in FIG. 5, a process that erases data that has been read from the memory 3 is added. Steps S21, S22, S23, and S24 shown in FIG. 5 correspond to steps S11, S12, S13, and S14 shown in FIG. 4, respectively.

Figure 6:
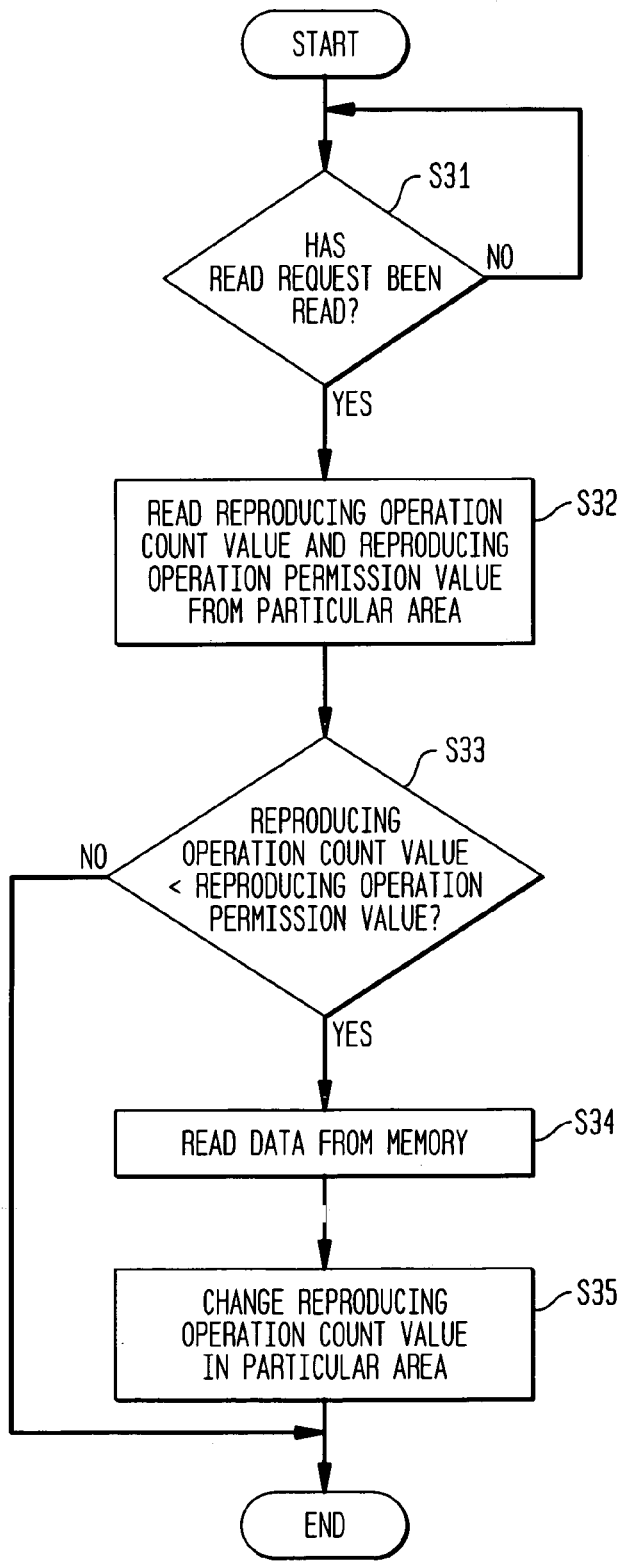
FIG. 6 is a flow chart for explaining a fourth example of the data reading operation according to the embodiment of the present invention.

FIG. 6 is a flow chart showing an operation that designates a reproducing operation count value and that reads (reproduces) data from the irreversibly writeable memory 3 until the designated value reaches its maximum value. When the determined result at step S31 represents that a read request has been received, the flow advance to step S32. At step S32, the reproducing operation count value and the reproducing operation permission value are read from the particular area. As was described above, the particular area may be formed in the memory 3 or in a region of the control IC 2. When data is recorded, the reproducing operation permission value is pre-written to the particular area. When a copyright owner distributes a content such as video and/or audio data, he or she can record both the reproducing operation permission value and the content data to the memory apparatus. As a result, the copyright of the content data can be protected.

As was described with reference to the counter area shown in FIG. 2B, in the particular area, the reproducing operation permission value is pre-designated by the number of data units assigned thereto, for example, eight. Whenever data is reproduced, one data unit is changed. The area shown in FIG. 2B is read at step S32. At step S33, it is determined whether the condition of (reproducing operation count value N<reproducing operation permission value?) is satisfied corresponding to the state of the particular area. When the condition is not satisfied, since (N≧reproducing operation permission value), the reproducing operation is prohibited and thereby the process is terminated.

When the condition of (reproducing operation count value N<reproducing operation permission value), the reproducing operation can be performed. In such a case, the flow advances to step S34. At step S34, data is read from the designated address of the memory 3. The read data is supplied to the host device through the page buffer 6 and the interface 4 (at step S34). Thereafter, the reproducing operation count value in the particular area is changed (at step S35).

Figure 7:
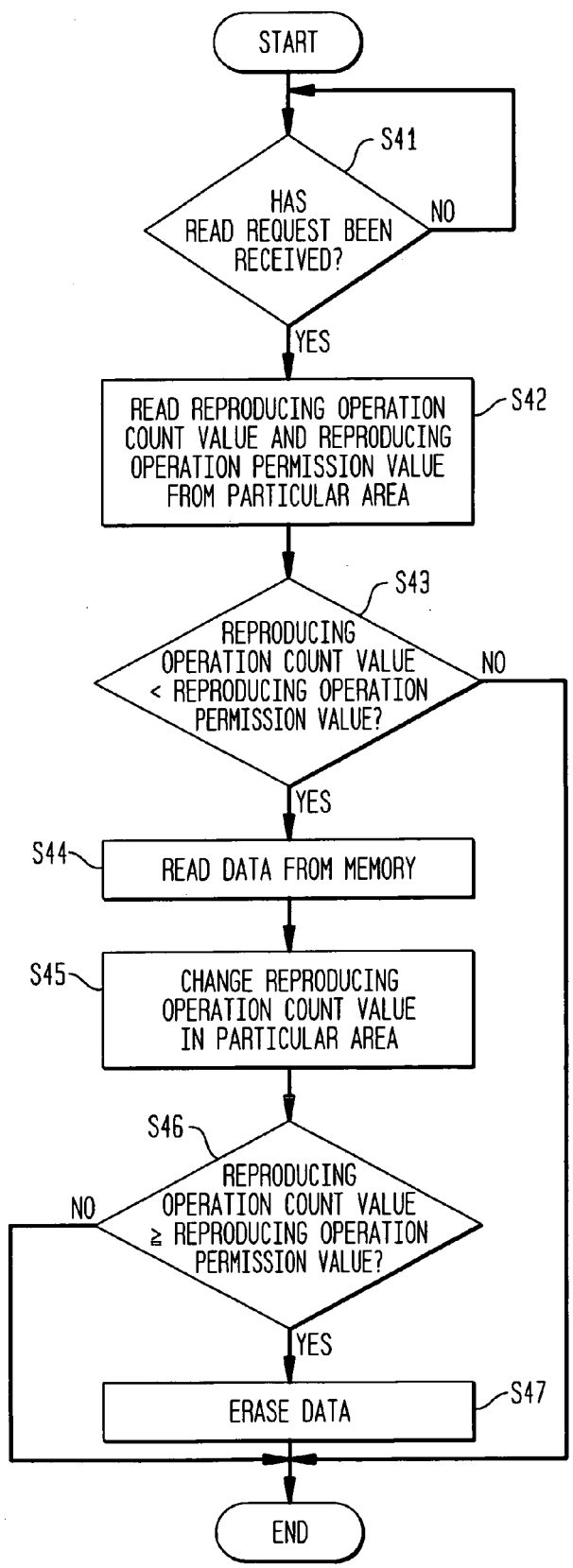
FIG. 7 is a flow chart for explaining a fifth example of the data reading operation according to the embodiment of the present invention.

The operation shown in FIG. 6 controls the memory 3 so that after the host device has read data from the memory 3 the permitted number of times, the host device may be prohibited from further accessing the data without erasing the data from the memory 3. Alternatively, data stored in the memory 3 may be erased so that the host device is prevented from further accessing the data. As a result, the security of data may be more improved than by the operation shown in FIG. 6. In other words, at step S46 of the flow chart shown in FIG. 7, it is determined whether the condition of (reproducing operation count value N≧reproducing operation permission value?) is satisfied. When the reproducing operation count value does not match the reproducing operation permission value, the process is terminated. When the determined result at step S46 represents that the reproducing operation count value N matches the reproducing operation permission value, the flow advances to step S47. At step S47, meaningless data is overwritten in the memory 3 in the manner described above with reference to FIG. 2A. As a result, the read data is erased. Steps S41, S42, S43, S44, and S45 shown in FIG. 7 correspond to steps S31, S32, S33, S34, and S35 shown in FIG. 6, respectively.

Figure 8:
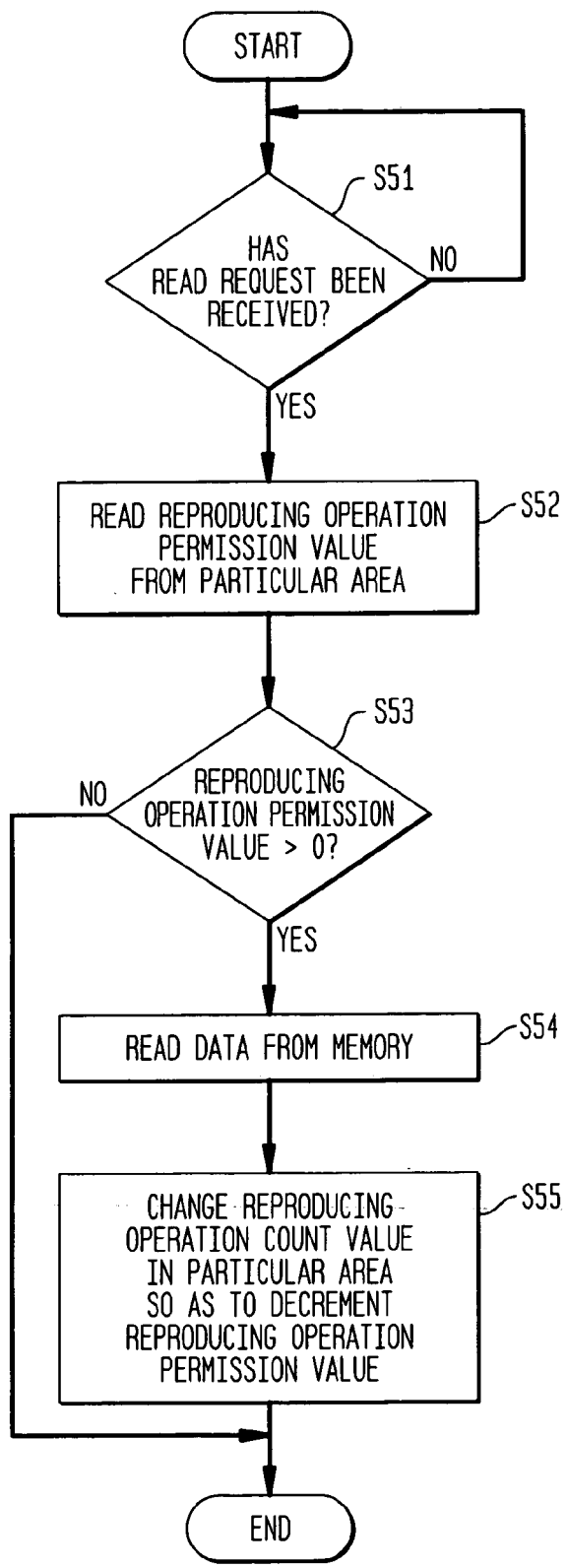
FIG. 8 is a flow chart for explaining a sixth example of the data reading operation according to the embodiment of the present invention.

Next, with reference to the flow chart shown in FIG. 8, another example of the method that restricts (the number of times of) the reproducing operation will be described. When the determined result at step S51 shown in FIG. 8 represents that a read request has been received, the flow advances to step S52. At step S52, the reproducing operation permission value is read from the particular area. At step S53, it is determined whether the condition of (reproducing operation permission value>0?) is satisfied. When the determined result represents that the condition is not satisfied, the process is terminated.

When the determined result at step S53 represents that the reproducing operation permission value is larger than 0, the flow advances to step S54. At step S54, data is read from the memory 3 and supplied to the host device (at step S54). At step S55, the reproducing operation count value in the particular area is changed. As a result, the reproducing operation permission value is decremented by 1. In the example shown in FIG. 2B, the reproducing operation permission value is pre-designated eight in the initial state. Whenever data is reproduced, the state of one data unit is changed and decrements the reproducing permission value. At step S52, the number of (white) data units that have not been changed is read as the reproducing operation permission value.

Figure 9:
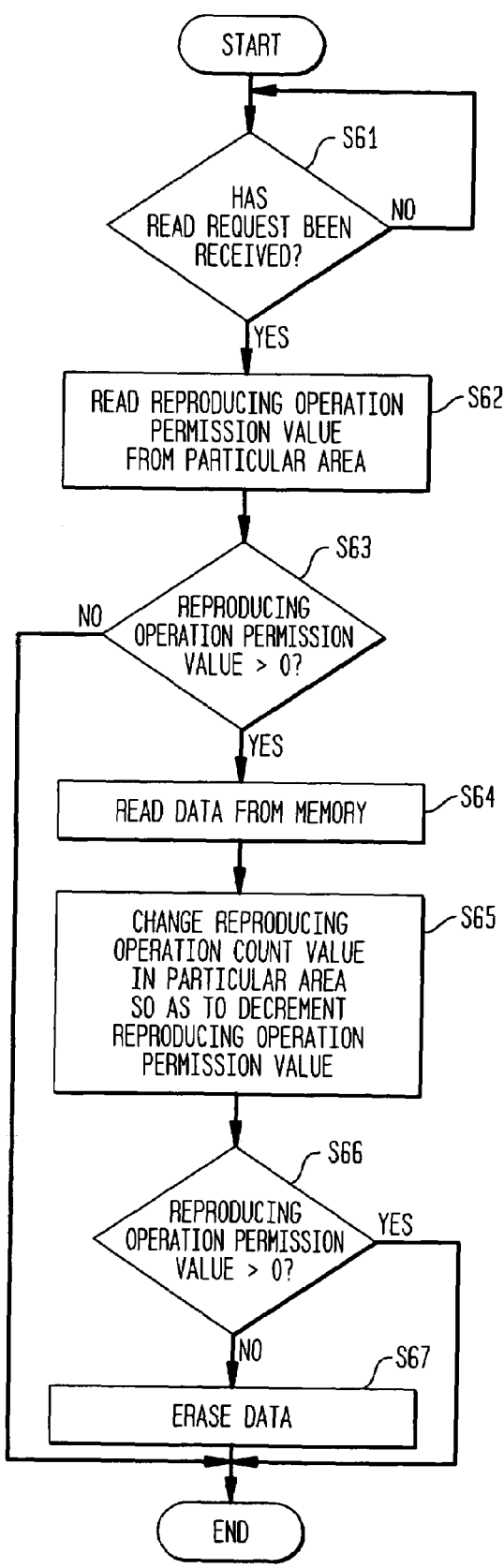
FIG. 9 is a flow chart for explaining a seventh example of the data reading operation according to the embodiment of the present invention.

The operation shown in FIG. 8 controls the memory 3 so that the host device may be prohibited from accessing data that has been read from the memory 3 without erasing the data from the memory 3. Alternatively, data may be erased from the memory 3 so that the host device cannot access the data at all. In this case, the security of data can be more improved than the operation shown in FIG. 8. In other words, at step S66 of the flow chart shown in FIG. 9, it is determined whether the condition of (reproducing operation permission value>0?) is satisfied. When the condition is satisfied (namely, the reproducing operation can be further performed), the process is terminated. In contrast, when the determined result at step S66 represents that the condition is not satisfied, the flow advances to step S67. At step S67, the read data is erased in the manner described above. Steps S61, S62, S63, S64, and S65 shown in FIG. 9 correspond to steps S51, S52, S53, S54, and S55 shown in FIG. 8, respectively.

In addition to controlling the reproducing operation and erasing operation for a data file such as a music data file recorded in an irreversibly writeable memory, the forgoing embodiment of the present invention can be applied to key data that decrypts encrypted data so as to erase or restrict the number of times of a reproducing operation for the key data in the forgoing manner.

The present invention is not limited to the forgoing embodiment. In other words, various modifications and applications of the present invention are available without departing from the spirit of the present invention. For example, according to the forgoing embodiment, the number of times of reproducing operation is restricted. Instead, the total time or valid period (from start date to end date) for which data can be reproduced may be recorded in the irreversibly writeable memory. In addition, the present invention can be applied to cash, electronic money, and a prepaid card that records points or the like that permit a reproducing operation. Corresponding to the value that has been used, data is updated. Moreover, the present invention can be applied to a delivery for an initial password. In this case, when the initial password is read, it is erased. As a result, the security of the initial password is protected.

According to the present invention, when data is read, previously unchanged data units in the data that has been read are overwritten so that the data is prohibited from being further read. Thus, even if the memory apparatus is disassembled and the irreversibly writeable memory is removed, it is impossible to read internal data. As a result, high security is assured. When a flash memory is used, by contrast, a special structure that prevents the memory from being illegally accessed should be provided. As a result, the cost of the apparatus adversely rises. Therefore, the cost of the irreversibly writeable memory is lower than the cost of the flash memory. In addition, when the present invention is applied to the irreversibly writeable memory, a special structure that assures the security of data is not required. Thus, the cost of the memory apparatus can be further reduced. In addition, when the reproducing operation is restricted, reproduction restriction information is written to irreversibly writeable memory. As a result, the reproduction restriction information can be prevented from being forged.

The invention claimed is:

1. A memory apparatus attachable to and detachable from a host device, the memory apparatus comprising:
   an irreversibly writeable memory; and
   a control circuit that controls operations of writing to and reading from the irreversibly writeable memory;
   a data area of the irreversibly writeable memory including a plurality of one-time writeable data units for storing data, the data being written to the irreversibly writeable memory by some of the plurality of one-time writeable data units being changed from an initial state and by remaining ones of the plurality of one-time writeable data units remaining in the initial state;
   the control circuit, in response to receiving a read request, (i) reads all of the data from the data area of the irreversibly writeable memory and then (ii) changes all of the remaining ones of the plurality of one-time writeable data units of the data area from their initial state so that the data cannot be further read.

2. A memory apparatus attachable to and detachable from a host device, the memory apparatus comprising:
   an irreversibly writeable memory;
   a control circuit that controls operations of writing to and reading from the irreversibly writeable memory;
   a data area disposed in the irreversibly writeable memory and including a plurality of one-time writeable data units for storing data, the data being written to the irreversibly writeable memory by some of the plurality of one-time writeable data units being changed from an initial state and by remaining ones of the plurality of one-time writeable data units remaining in the initial state; and
   a further data area operable to store reproduction restriction information, the further data area being disposed in the irreversibly writeable memory or in an irreversibly writeable memory region of the control circuit;
   the control circuit, in response to receiving a request to read the data written to the data area of the irreversibly writeable memory when the reading operation is restricted by the reproduction restriction information, (i) is prohibited from carrying out the reading operation so that the data is not read from the data area of the irreversibly writeable memory and then (ii) changes the remaining ones of the plurality of one-time writeable data units of the data area from their initial state.

3. A memory apparatus attachable to and detachable from a host device, the memory device comprising:
   an irreversibly writeable memory;
   a control circuit that controls operations of writing to and reading from the irreversibly writeable memory;
   a data area disposed in the irreversibly writeable memory and including a plurality of one-time writeable data units for storing data, the data being written to the irreversibly writeable memory by some of the plurality of one-time writeable data units being changed from an initial state and by remaining ones of the further plurality of one-time writeable data units remaining in the initial state; and
   at least one further data area disposed in the irreversibly writeable memory or in an irreversibly writeable memory region of the control circuit, the further data area including a counter area having a further plurality of one-time writeable data units for storing a reading operation count value that represents the number of times that the data has been read from the data area of the irreversibly writeable memory, the number of one-time writeable data units in the counter area representing a maximum number of times that the data may be read;
   the control circuit, in response to receiving a request to read the data from the data area of the irreversibly writeable memory, (i) reads all of the data from the data area of the irreversibly writeable memory, (ii) changes one of the one-time writeable data units in the counter area from the initial state whereby the reading operation count value is changed, and if all of the one-time writeable data units in the counter area are thereby changed from their initial state, the control circuit (iii) is prohibited from further reading of the data so that the data is not read from the data area of the irreversibly writeable memory and then (iv) changes the remaining ones of the plurality of one-time writeable data units of the data area from their initial state.

4. A memory apparatus as set forth in claim 1, 2, or 3, wherein the irreversibly writeable memory is a nonvolatile semiconductor memory that can be attached to and detached from the host device.

5. A method for controlling a memory apparatus attachable to and detachable from a host device, the memory apparatus including an irreversibly writeable memory and a control circuit that controls operations of writing to and reading from the irreversibly writeable memory, the irreversibly writeable memory including a data area that includes a plurality of one-time writeable data units for storing data, the data area including previously written data represented by some of the plurality of one-time writeable data units being changed from an initial state and by remaining ones of the plurality of one-time writeable data units remaining in the initial state; the method comprising:
   receiving a read request; and
   in response to receiving the read request,
   (i) reading all of the previously written data from the data area of the irreversibly writeable memory, and
   (ii) then changing all of the remaining ones of the plurality of one-time writeable data units of the data area of the irreversibly writeable memory from their initial state so that the previously written data cannot be further read.

6. A method for controlling a memory apparatus attachable to and detachable from a host device, the memory apparatus including an irreversibly writeable memory and a control circuit that controls operations of writing to and reading from the irreversibly writeable memory, the irreversibly writeable memory including a data area that includes a plurality of one-time writeable data units for storing data, the data area including previously written data represented by some of the plurality of one-time writeable data units being changed from an initial state and by remaining ones of the plurality of one-time writeable data units remaining in the initial state; the method comprising:

providing a further data area for storing reproduction restriction information, the further data area being disposed in the irreversibly writeable memory or in an irreversibly writeable memory region of the control circuit;

receiving a read request; and in response to receiving the read request, (i) determining whether the reading operation is restricted by the reproduction restriction information, and if the reading operation is not restricted by the reproduction restriction information, (ii) reading the previously written data from the data area of the irreversibly writeable memory, else if the reading operation is restricted by the reproduction restriction information, (ii) prohibiting reading of the previously written data from the data area of the irreversibly writeable memory and (iii) then changing the remaining ones of the plurality of one-time writeable data units of the data area from their initial state.

7. A method for controlling a memory apparatus attachable to and detachable from a host device, the memory apparatus including an irreversibly writeable memory and a control circuit that controls operations of writing to and reading from the irreversibly writeable memory, the irreversibly writeable memory including a data area that includes a plurality of one-time writeable data units for storing data, the data area including previously written data represented by some of the plurality of one-time writeable data units being changed from an initial state and by remaining ones of the plurality of one-time writeable data units remaining in the initial state; the method comprising:

providing at least one further data area that includes a counter area for storing a reading operation count value that represents the number of times that the data has been read from the data area of the irreversibly writeable memory, the at least one further data area being disposed in the irreversibly writeable memory or in an irreversibly writeable memory region of the control circuit, the counter area including a further plurality of one-time writeable data units wherein the number of one-time writeable data units in the counter area represents a maximum number of times that the associated data may be read;

receiving a read request; and in response to receiving the read request, (i) reading all of the data from the data area of the irreversibly writeable memory, (ii) changing one of the one-time writeable data units in the counter area from the initial state so that the reading operation count value is changed, and if all of the one-time writeable data units in the counter area are thereby changed from their initial state, (iii) prohibiting further reading of the data from the data area of the irreversibly writeable memory and then (iv) changing the remaining ones of the plurality of one-time writeable data units of the data area from their initial state.

8. A memory apparatus as set forth in claim 1, wherein the data written to the irreversibly writeable memory is selected from the group consisting of a password, an encryption key, and a decryption key.

9. A memory apparatus as set forth in claim 2, wherein the data area includes a plurality of one-time writeable data units for storing the reproduction restriction information.

10. A memory apparatus as set forth in claim 9, wherein the plurality of one-time writeable data units of the data area are in their initial state when the reading operation is not restricted.

11. A memory apparatus as set forth in claim 9, wherein when the reading operation is not restricted by the reproduction restriction information, the data written to the irreversibly writeable memory is read and an address of the data is written to the data area to prevent further reading of the data.

12. A memory apparatus as set forth in claim 2, wherein the reproduction restriction information includes an address of the data written to the irreversibly writeable memory when the reading operation is restricted by the reproduction restriction information.

13. A memory apparatus as set forth in claim 2, wherein the reproduction restriction information includes a time interval during which the data written to the irreversibly writeable memory may be reproduced.

14. A memory apparatus as set forth in claim 3, wherein the maximum number of times that the associated data may be reproduced corresponds to a maximum monetary value or to a maximum point value.

15. A method as set forth in claim 5, wherein the previously written data is selected from the group consisting of a password, an encryption key, and a decryption key.

16. A method as set forth in claim 6, wherein the further data area includes a further plurality of one-time writeable data units for storing the reproduction restriction information.

17. A method as set forth in claim 16, wherein the further plurality of one-time writeable data units of the further data area are in their initial state when the reading operation is not restricted.

18. A method as set forth in claim 16, further comprising, in response to receiving the read request, (iii) writing an address of the previously written data in the further data area if the reading operation is presently not restricted by the reproduction restriction information to prevent further reading of the previously written data.

19. A method as set forth in claim 6, wherein the reproduction restriction information includes an address of the previously written data when the reading operation is restricted by the reproduction restriction information.

20. A method as set forth in claim 6, wherein the reproduction restriction information includes a time interval during which the previously written data may be reproduced.

21. A method as set forth in claim 7, wherein the maximum number of times that the associated data may be reproduced corresponds to a maximum monetary value or to a maximum point value.

* * * * *